Patented Nov. 8, 1927.

1,648,602

UNITED STATES PATENT OFFICE.

WILLIAM C. ARSEM, OF SCHENECTADY, NEW YORK, ASSIGNOR TO COMMERCIAL SOLVENTS CORPORATION, OF TERRE HAUTE, INDIANA, A CORPORATION OF MARYLAND.

PROCESS FOR PRODUCTION OF FORMALDEHYDE.

No Drawing. Application filed August 4, 1926. Serial No. 127,188.

My invention relates to the production of formaldehyde by the catalytic decomposition of formic acid, preferably at elevated pressures.

It is well known that formic acid and formates are decomposed by heat and that, under some conditions, formaldehyde is a product of the decomposition (viz, U. S. Patent 915,946 to Ellis).

The varied products obtained by the decomposition of formic acid result from the fact that formic acid is decomposed by heat in two separate ways. One set of products is obtained by the interaction of two molecules of formic acid, whereas different products result from the decomposition of one molecule of formic acid, thus:—

(1) $HCOOH + HCOOH = HCHO + CO_2 + H_2O$;

(2) $HCOOH + H_2O = H_2 + CO_2 + H_2O$.

Reaction (1) yields formaldehyde, water, and carbon dioxide, while reaction (2) yields hydrogen and carbon dioxide.

The mechanism in both cases is very similar, if it is assumed that reaction takes place between two adjacent molecules adsorbed on the surface of a catalyst, and the reactions result in the release of the new atomic groupings which appear as products of the reaction. While reaction (2) requires the presence of water for its promotion, sufficient water is always present as the result of reaction (1), since the reactions occur simultaneously.

Hoffman and Schibsted (Berichte d. Deutsche Chemische Gesell. 1918, volume 51, pp. 1398–1418) found that when the vapors of formic acid were led over ordinary catalytic substances such as platinized asbestos, alumina, etc., the material was broken down almost exclusively into hydrogen and carbon dioxide or into steam and carbon monoxide. They reported, however, that by careful catalyst selection and temperature control they were able to produce reaction (1) to such an extent that considerable quantities of formaldehyde were produced. The maximum yield of formaldehyde reported was but 12%.

My invention relates to certain improvements in the production of formaldehyde by the catalytic decomposition of formic acid. One object of my invention is to provide improved catalysts whereby the reaction is controlled to produce formaldehyde selectively, the catalysts consisting of basic salts of metals whose oxides are known to decompose formic acid to produce formaldehyde. Another object of my invention is to provide an improved process, capable of producing high yields of formaldehyde, the said improvement being attained by diluting the formic acid vapor with carbon dioxide. Other objects of my invention will later be made apparent.

My improved catalysts, comprising basic salts of metals whose oxides are capable of catalytically assisting in the decomposition of formic acid vapors to produce some formaldehyde include the stable basic salts, preferably basic chlorides or basic sulfates, of zinc, tin, magnesium, strontium, etc. I have found by experiment that these basic salts are far superior to ordinary metal oxides as catalysts for the decomposition of formic acid to formaldehyde, producing larger yields of formaldehyde, or, what is equivalent, producing a much smaller yield of the undesirable by-products of reaction (2)—i. e. hydrogen and carbon dioxide.

While the exact method by which this improved result is attained is not known, it appears probable that the phenomenon is connected with modification of the metal oxide catalyst surface by the "blocking" of some of the oxide valences through the introduction of the acid groups which convert the metal oxides to basic salts. Since the metal oxides ordinarily useful as catalysts are polyvalent it is reasonable to assume that the two valences available for the addition of acid radicles are unequal in strength or that one valence is available for catalytic reaction before the other one. In the course of the catalytic action other products than formic acid will be adsorbed on the surface of the catalyst, these other products being the end-products of reactions (1) and (2)— namely formaldehyde, water, hydrogen, and carbon dioxide.

As the result of my experimental work I have come to the conclusion that the small yields of formaldehyde obtained by the catalytic decomposition of formic acid in the presence of metal oxides is due largely to the adsorption of reaction by-products on the catalyst surface. Apparently an ordinary metal oxide catalyst selectively adsorbs water in preference to formic acid. The concentration of adsorbed molecules of water on the surface of the catalyst not only tends to inhibit the production of formaldehyde by ordinary "blocking" but the proximity of the adsorbed water to the adsorbed formic acid molecules promotes undesirable reaction (2).

On the contrary, when metal oxide catalysts are replaced by basic salts of identical or similar metals the yield of formaldehyde obtainable is greatly improved and I attribute this to the "neutralization" of the most active oxide valence by the addition of the acid in basic salt formation, whereby the selective absorption of water on the catalyst is apparently prevented.

Carbon dioxide is more readily adsorbed by my improved catalysts than is water, though less readily than formic acid. This fact probably accounts for the improved result obtained when the formic acid reaction is conducted in the presence of carbon dioxide. The ideal condition, in which only formic acid is adsorbed and broken down by the catalyst, as shown in reaction (1), is not attainable. However the presence of carbon dioxide in relatively large quantities apparently cuts down the adsorption of water by the catalyst and thus retards undesirable reaction (2). While the above-described theory is believed by me to accurately describe the nature of the improved result attained in the presence of carbon dioxide, it should be understood that my invention and appended claims are in no way dependent on the theory.

Essentially my improved process consists in passing the vapors of formic acid at an elevated temperature over my improved catalysts, whereupon the formic acid is decomposed to formaldehyde. The precise optimum temperature is dependent on the specific catalyst employed, but in general the operative temperature range is 300-500° C. The formaldehyde formed is recovered by ordinary adsorption or condensation methods and the residual formic acid may be returned to the process. As previously described, the yield of formaldehyde is increased if the formic acid vapors are largely diluted with carbon dioxide. While my process may be operated at normal (atmospheric) pressure with good results, I have found that when it is operated at elevated pressures, for example 10-100 atmospheres, even better results are attained.

The fact that improved results may be attained at elevated pressures is not readily discernible from ordinary thermodynamical considerations. Both reactions (1 and 2) produce an expansion of volume since two molecules are broken down to form three molecules. Ordinarily it would be considered that an increase of pressure would cause a slowing down of the reactions and probably a reversal. However in the present instance this is not the case. The principal factors in the case are three:—

1. Nearness of approach to equilibrium as determined by the time of contact between the gases and the catalyst;
2. The effect of pressure on equilibrium;
3. The effectiveness of the catalyst as determined by its power to adsorb the reacting gases.

At atmospheric pressure the degree of conversion is far below the equilibrium value, and it is not greatly affected by increasing the pressure which, according to the law of mass action, should lower the equilibrium concentration of the products. On the other hand, an increase of pressure will favor the increased adsorption of gases by the catalyst and thus increase the rate of reaction so that with a given space velocity there will be a closer approach to equilibrium and a higher yield of products.

By "space velocity" is meant the number of volumes of reacting gases passing through one volume of catalyst, per hour.

Now having described my invention I shall give several illustrative examples.

Example I.

50 grams stannous chloride was dissolved in 100 grams water to form a milky solution. 200 grams of serpentine asbestos (other inert catalyst supports could be substituted) was stirred into the solution and 135 grams of 10% sodium hydroxide solution was added with stirring, whereupon stannous oxychloride was precipitated. After standing for several hours the mass was filtered, washed with water, and dried at a low temperature, whereupon it was ready for catalytic use. The catalyst was placed in a suitable reaction tube heated to 300-330° C. and through the tube was passed a stream of carbon dioxide gas containing formic acid vapors. This mixture can be prepared in any convenient fashion, for example by bubbling the carbon dioxide gas through warm liquid formic acid. In this case the molecular ratio of formic acid to carbon dioxide was 1:29 and the space velocity of formic acid passage was 64. The evolved gas was cooled and a mixture of formaldehyde and formic acid was thus condensed out. These substances are readily separable owing to the variance in boiling point. The yield of formaldehyde was 40% of the theoretical, based on formic acid consumed, and a conversion of about 50% of the formic acid passed through the apparatus was obtained.

*Example II.*

25 grams zinc carbonate was added to 100 grams of water and sufficient formic acid was added to convert the zinc carbonate to zinc formate.

25 grams zinc carbonate was added to 100 grams of water and sufficient hydrochloric acid was added to convert the zinc carbonate to zinc chloride. The two solutions were mixed and warmed and 200 grams asbestos was added with stirring. The product was filtered, washed, dried, and heated to 400° C. for one half hour. The zinc oxychloride catalyst thus prepared, was then ready for use.

The conditions of the experiment were similar to those described in Example I, except that the temperature was 360–375° C., the molar ratio of formic acid to carbon dioxide was 1:1.5, and the space velocity based on formic acid was 630. Under these conditions a 45% yield of formaldehyde, based on formic acid consumed and a 60% conversion were obtained.

*Example III.*

68 grams zinc chloride was dissolved in 200 grams of water, 40 grams of zinc oxide was added with stirring and 200 grams of serpentine asbestos was added to serve as a catalyst support. The mixture was heated to about 90° C. and was then cooled and filtered. The resultant mass was heated gradually up to 340° C. after which the zinc oxychloride catalyst was ready for use. The conditions of the experiment were similar to those of Example I, except that the molar ratio of formic acid to carbon dioxide was 1:20 and the space velocity based on formic acid varied from 57–80. A yield of 45% of formaldehyde based on formic acid consumed was obtained and the conversion at one passage was about 50%.

*Example IV.*

100 grams zinc sulfate ($ZnSO_4.7H_2O$) was dissolved in 200 grams of water. 84 grams of zinc oxide and 200 grams asbestos was added after which the solution was boiled vigorously for 10 hours. After filtering, the resultant zinc oxysulfate catalyst was dried and heated to 300° C. for an hour, after which it was ready for use.

The conditions of the experiment were similar to those of Example I, except that the molecular ratio of formic acid to carbon dioxide was 1:20, the space velocity based on formic acid was 100, and the temperature of reaction was 385–415° C. A yield of 45% formaldehyde based on formic acid was obtained, and the conversion at one passage was about 60%.

*Example V.*

10 c. c. of the catalyst prepared in Example I was placed in an electrically heated bomb capable of withstanding high pressure. A mixture of formic acid vapors and carbon dioxide in the molecular ratio 1:20 was passed at 2000 pounds pressure over the catalyst which was maintained at a temperature of 385–400° C. The resultant gas mixture, after passing over the catalyst, was cooled and the reaction products were recovered by condensation. A yield of 60% formaldehyde, based on formic acid consumed was obtained, and the conversion at one gas passage was about 70%.

*Example VI.*

The catalyst prepared in Example I was employed. Formic acid in vapor state was passed at a space velocity of 40 over the catalyst which was maintained at a temperature of 350–375° C. The reaction products were collected by condensation and it was found that the yield based on formic acid consumed was 25% and that a conversion of 10% on one passage had been obtained.

Now having described my invention, I claim the following as new and novel:—

1. A process for the production of formaldehyde which comprises passing formic acid in vapor state at 300–500° C. over a catalyst comprising the stable basic salt of a metal, the oxide of which is a catalyst for the reaction.

2. A process for the production of formaldehyde which comprises passing formic acid, at elevated pressure, in vapor state at 300–500° C. over a catalyst comprising the stable basic salt of a metal, the oxide of which is a catalyst for the reaction.

3. A process for the production of formaldehyde which comprises passing formic acid in vapor state at 300–500° C. over a catalyst comprising basic chloride of a metal, the oxide of which is a catalyst for the reaction.

4. A process for the production of formaldehyde which comprises passing formic acid vapors diluted with carbon dioxide at 300–500° C. over a catalyst comprising the stable basic salt of a metal, the oxide of which is a catalyst for the reaction.

5. A process for the production of formaldehyde which comprises passing formic acid vapors diluted with carbon dioxide at 300–500° C., at elevated pressure, over a catalyst comprising the stable basic salt of a metal, the oxide of which is a catalyst for the reaction.

6. A process for the production of formaldehyde which comprises passing formic acid vapors diluted with carbon dioxide at 300–500° C. over a catalyst comprising basic chloride of a metal, the oxide of which is a catalyst for the reaction.

7. A process for the production of formaldehyde which comprises passing formic acid vapors diluted with carbon dioxide at 300–500° C. and at elevated pressure over a catalyst comprising the stable basic salt of a metal, the oxide of which is a catalyst for the reaction.

In testimony whereof I affix my signature.

WILLIAM C. ARSEM.